US011122165B1

(12) United States Patent
Thiyagarajan et al.

(10) Patent No.: US 11,122,165 B1
(45) Date of Patent: Sep. 14, 2021

(54) SYSTEMS AND METHODS FOR CUSTOMER SERVICE AGENT-GUIDED CHAT SESSION DIGITAL ASSISTANT

(71) Applicant: Verizon Patent and Licensing Inc., Basking Ridge, NJ (US)

(72) Inventors: Saivivek T. Thiyagarajan, Ashburn, VA (US); Shoma Chakravarty, Chevy Chase, MD (US); Sankar Shanmugam, Dayton, NJ (US); Srinivasa Kaniganti, Frisco, TX (US); Madhu Talupur, Princeton, NJ (US); Sathiyamoorthy Dhanapal, Suwanee, GA (US); Amit Mahajan, Bridgewater, NJ (US); Nitin Ahuja, Irving, TX (US); Amar Nageswaram, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/887,260

(22) Filed: May 29, 2020

(51) Int. Cl.
*H04M 3/00* (2006.01)
*H04M 3/51* (2006.01)
*H04L 12/58* (2006.01)

(52) U.S. Cl.
CPC .......... *H04M 3/5191* (2013.01); *H04L 51/02* (2013.01); *H04M 3/5175* (2013.01)

(58) Field of Classification Search
CPC .... H04M 3/5191; H04M 3/5175; H04L 51/02
USPC ...... 379/265.01–265.14, 266.01–266.1, 309; 704/9
See application file for complete search history.

(56) References Cited

U.S. PATENT DOCUMENTS

| 9,973,457 B2* | 5/2018 | Cauchois ............... H04L 51/046 |
| 10,388,274 B1* | 8/2019 | Hoffmeister ...... G06F 16/24522 |
| 2016/0092447 A1* | 3/2016 | Venkataraman ...... G06F 16/433 707/765 |
| 2018/0052664 A1* | 2/2018 | Zhang ............... G06F 16/90332 |
| 2018/0212904 A1* | 7/2018 | Smullen ................ H04L 67/322 |
| 2018/0285768 A1* | 10/2018 | Karuppasamy ........ G06N 5/046 |
| 2019/0043106 A1* | 2/2019 | Talmor .................... G06N 3/006 |
| 2020/0059559 A1* | 2/2020 | Mazza ..................... G10L 15/16 |
| 2020/0081939 A1* | 3/2020 | Subramaniam ........ G06N 5/022 |
| 2020/0285660 A1* | 9/2020 | Kim ..................... G06F 16/3334 |
| 2020/0349614 A1* | 11/2020 | Batcha .................... H04L 51/14 |
| 2020/0351405 A1* | 11/2020 | Pace ................... H04M 3/5191 |

* cited by examiner

Primary Examiner — William J Deane, Jr.

(57) ABSTRACT

A method, device, and computer-readable medium provide for receiving, via a chatbot access channel, a chat message from a user device associated with a customer chat session; determining that the chat message includes a customer intent that corresponds to a chat flow for the customer chat session; generating one or more suggested response messages based on the chat message, wherein at least one of the one or more suggested response messages includes a previously stored chat message response corresponding to the customer intent and approved by a service agent; presenting, via a display, a transcript of a messaging sequence for the customer chat session concurrently with a user interface that enables the service agent to perform an action with respect to the one or more suggested response messages; and sending, via the chatbot access channel, a selected one of the one or more suggested response messages to the user device.

20 Claims, 7 Drawing Sheets

SYSTEMS AND METHODS FOR CUSTOMER SERVICE AGENT-GUIDED CHAT SESSION DIGITAL ASSISTANT

BACKGROUND INFORMATION

Businesses and other types of organizations often operate customer service centers for handling customers' requests for descriptions of and/or issue resolution regarding product/service features and offerings, equipment setup and installation, performance issues, technical support, or other information (e.g., billing, etc.). Interactions may be conducted using some combination of digital assistants and live customer representatives (agents) to interact with customers for enabling access to account information, processing orders, scheduling services, offering troubleshooting solutions, etc. Currently, the artificial intelligence (AI) resources available to the agents present various technological challenges that affect the customer experience, for instance, relative to minimizing the average customer handling times. For example, in the absence of an integrated system of assistive AI tools, agents must consult multiple applications and navigate their user interfaces (e.g., windows, browsers, etc.) during a typical transaction, which limits potential economies of concurrency (i.e., increased agent to customer ratio).

DETAILED DESCRIPTION OF PREFERRED EMBODIMENTS

The following detailed description refers to the accompanying drawings. The same reference numbers in different drawings identify the same or similar elements. The following detailed description does not limit the invention, which is defined by the claims.

A "chatbot" may refer to a computer application that simulates person-to-person dialog to conduct a chat session—as experienced by an end user using an electronic communication device (e.g., a smart phone, personal computer, etc.). Chatbot systems may present an end user with a convenient conversational interface for prompt resolution of a submitted inquiry (e.g., technical support), or efficient provision of a requested service (e.g., a service/device upgrade), irrespective of live agent staffing availability. However, optimizing a chatbot to simulate human conversation during a customer chat session—start to finish—is technically complex.

For purposes of description, an end user will be referred to as a "customer," which reference is not intended to limit practices according to this disclosure to an end user being within the definition of a "customer." Accordingly, the term end user device will be referred to interchangeably with the term customer device. Description of a live customer service agent (CSA), hereinafter referred to as a "service agent," assumes an agent device display proximal to the service agent, for example, associated with a customer service center (CSC). The term "intent" may correspond, for example, to a verb or action-type word that is extracted from a customer's chat message.

Structuring of a chatbot conversation flow or messaging sequence involves tailoring the chatbot to logically associate with the natural language processing (NLP) engine being utilized. To avoid high computational requirements of NLP, a chatbot may outsource natural language understanding (NLU) for customer inputs to vendor-based NLP engines, for example, IBM Watson™, Amazon Lex™, or Google Dialogflow™. Depending on the particular business environment and specific application, consideration may be given to the varying capabilities and limitations of the NLP engines, for example, in terms of data types and protocol, as well as their NLP algorithms.

Chatbot systems that account for these and other NLP considerations may nevertheless experience, during chat sessions, "fallout" events, i.e., an instance when the NLP algorithm fails to match the customer's expressed intent to a predefined chat flow. For example, the detected intent may not correspond to any flow available in an intent context tracker. Fallout may trigger a handoff of the transaction to a service agent. The chatbot-to-service agent transition may impose pressure on the service agent to promptly consult several chat windows and browsers to review the messaging transcripts for the customer chat session to resolve the customer's issues.

The service agent may then be tasked with improvising a non-standardized response to the customer which corresponds to the customer's intent. The service agent's dynamic response may or may not be consistent with a generally applicable response to the customer's intent. That is, the service agent's response may be inconsistent with a previous response given in another transaction due to a variety of factors, e.g., a variation in the assistive tools consulted and/or level of agent training, individual communication styles, etc. Additionally, instead of no match, the NLP algorithm may make an incorrect match that may also trigger handoff to a service agent for handling to completion.

Systems and methods disclosed herein provide chatbot interfaces, for use across multiple NLP engines, enabled to use service agent guidance to continuously re-adjust to reduce fallout and improve accuracy, and also control efficient allocation and hand-off of customer chat session tasks between chatbots and service agents. A continuous feeding/learning process to improve chatbot pattern matching, fallouts, and wrong matches may improve customer experiences.

Systems and methods disclosed herein may also provide the capability to readily implement agent-guided functionality to a variety of chatbots, customized by the chatbot system user to the system user's particular needs, and to the needs and preferences of the system user's customers, through the initiation of new chat flows under an agent ID and indexed to a unique ID in an intent context tracker. Systems and methods disclosed herein may also provide, as a further feature of being readily configurable by the chatbot system user, a relatively seamless transition between an agent-view graphical user interface (GUI) and a customer-view GUI, by providing a dynamic transaction container based on customer input, namely, "entities" extracted from customer inquiries which, when acted upon, trigger a chat flow or a frequently asked question (FAQ)/Document assistance.

Systems and methods disclosed herein can also provide capability of improved chatbot training, through agent monitoring of and dynamic intervention upon chatbot fallout, and repurposing of customized agent-customer interchanges, to continually improve chatbot performance—including speed and efficiency of the chatbot in task accomplishment, and customer experience.

Systems and methods disclosed herein may also provide agent-guided customer chat sessions. The agent-guided chatbot assistant may implement machine learning to help improve chat session accuracy in responding to customer queries, significantly shorten average customer handling times, and allow an agent to drive multiple customer chat sessions concurrently, through the re-use of user interface (UI) objects or widgets, auto-population, auto-suggest, etc.

Figure 1:
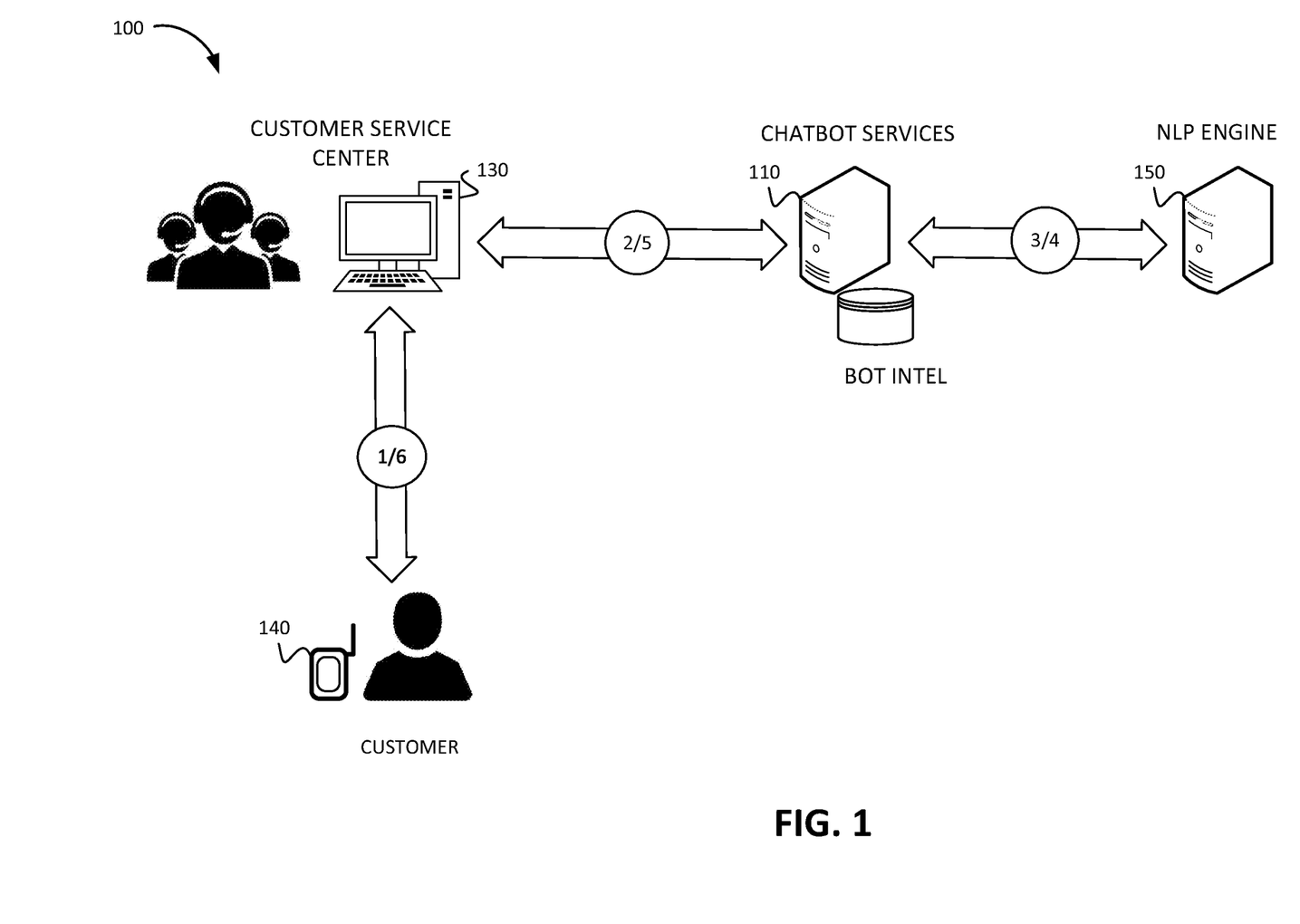
FIG. 1 is a diagram illustrating an environment according to an implementation described herein.

FIG. 1 illustrates an exemplary overview of an implementation described herein. A customer may use an end user device 140 to contact (e.g., message represented by arrow 1) a customer service center (CSC) 130 or customer care center (CCC) to initiate a chat session. CSC 130 may forward the message (data represented by arrow 2) to a chatbot services platform 110. Chatbot services platform 110 may forward the data (e.g., natural language data represented by arrow 3) to an NLP engine 150. NLP engine 150 may process the NL data to detect "intents," "entities," etc., and generate and provide a response (represented by arrow 4) to chatbot services platform 110. As used herein, an intent may include an action or activity (e.g., a verb) that a customer wants to perform or is inquiring into. As used herein, an entity may refer to the content (e.g., a noun) or object of the intent. Chatbot services platform 110 may determine that no flow is available for the detected intent ("fallout") and notify (represented by arrow 5) CSC 130. Based on the notification, CSC 130 may assign a customer representative (live agent) to create a chat flow for the chat session and send an agent-approved chat message (represented by arrow 6) to the customer at end user device 140.

Figure 2:
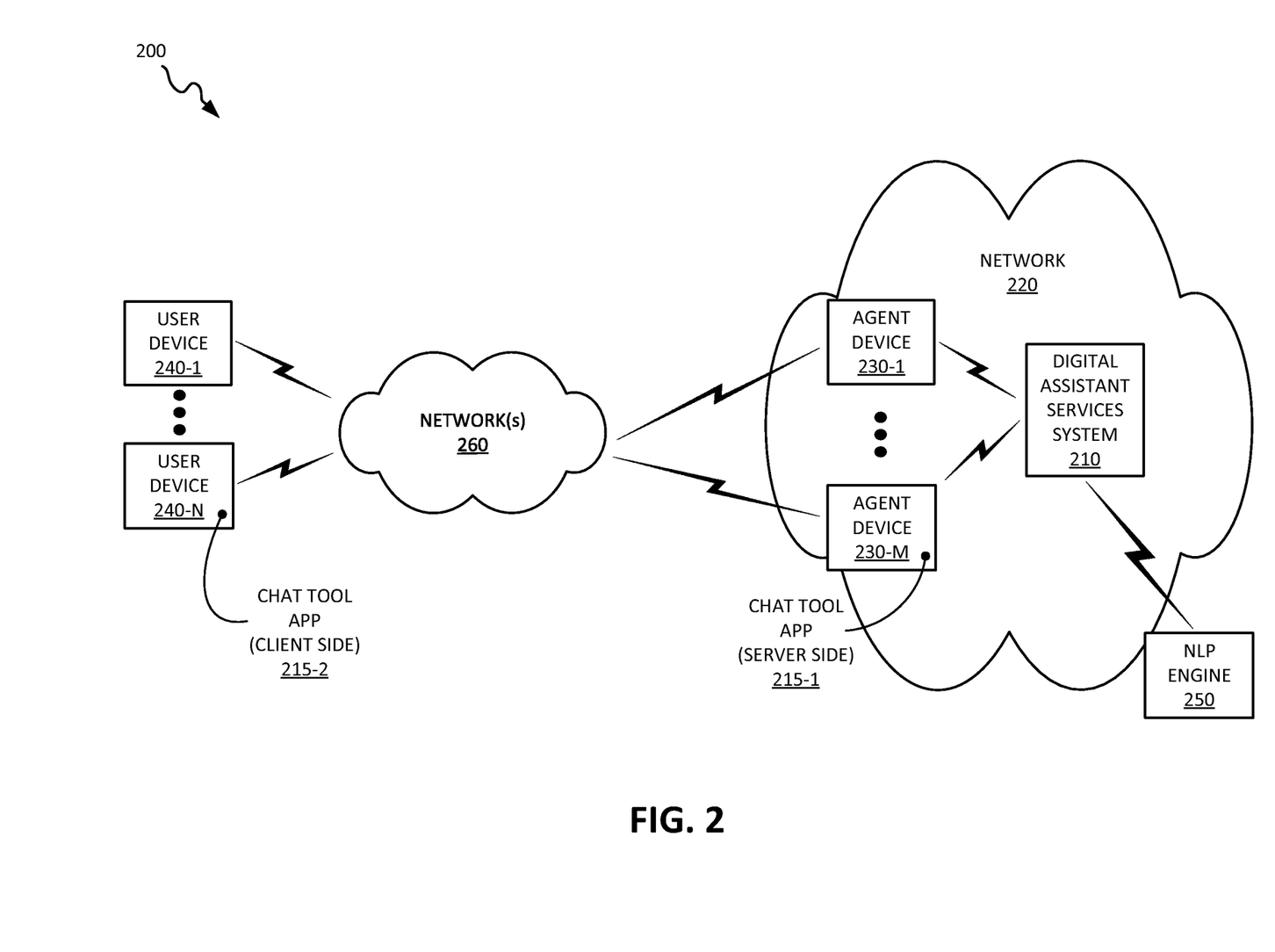
FIG. 2 is a diagram illustrating an exemplary system that includes the chatbot system of FIG. 1 according to an implementation described herein.

FIG. 2 illustrates an example environment in which systems and/or methods, described herein, may be implemented. As shown in FIG. 2, environment 200 may include digital assistant services system 210, organization network 220, agent devices 230-1 through 230-M (where M is an integer greater than or equal to 1), user devices 240-1 through 240-N (where N is an integer greater than or equal to 1), NLP engine 250, and network 260.

Digital assistant services system 210 may include one or more computing devices, such as a server device or a collection of server devices. In some implementations, digital assistant services system 210 may include artificial intelligence (AI) and/or machine learning (ML) capabilities. As shown, digital assistant services system 210 may be part of a network 220 associated with an organization, such as a CSC, and/or may be capable of communicating with one or more devices, such as agent devices 230 and/or NLP engine 250. Digital assistant services system 210 may receive information and assistance from agent device 230 for configuring a chatbot tool graphical user interface (GUI). A chatbot tool GUI may include logical rules and/or information for enabling an agent-guided chatbot that may assist with customer issue resolution in a chatbot session.

Additionally or alternatively, digital assistant services system 210 may receive natural language generation data from NLP engine 250 regarding an ongoing chat session between a chatbot (e.g., of agent device 230) and a customer (e.g., of user device 240) and identify an available chat flow based on chat data including detected intent and entities. Additionally, or alternatively, digital assistant services system 210 may receive AI and/or ML data and/or guidance based on a detected intent and/or a fallout, the chat messaging sequence between the chatbot and the customer, and/or information regarding the customer, products or services associated with the customer, etc., and/or may provide a UI object or widget and/or suggested response (predictive feed) to agent device 230. In some implementations, digital assistant services system 210 may generate multiple alternative responses, which may correspond to multiple flows, over the course of a single customer chat session conducted by a chatbot and/or agent.

Digital assistant services system 210 may include one or more memory devices, such as a database or a collection of databases that store information that may be used as content for generating a chat session GUI and a predictive feed application GUI for a chat session based on a NLP data. Examples of such information may include identification information of the customer (e.g., a name, an email address, a street address, a telephone number, etc.), account information of the customer (e.g., an account number, products or services plans, customer premises equipment (CPE), service level agreements (SLAs) etc.), transaction information (e.g., billing/payment history, account balances, outstanding bills, etc.), communication history information (e.g., previous instances of the customer inquiries, topics previously discussed, chat outcomes, etc.), and more.

Agent device 230 may include a device capable of communicating via a network, such as network 260. For example, agent device 230 may include one or more computing devices, such as a laptop computer, a desktop computer, a tablet computer, etc. Agent device 230 may be used by an individual within an organization, such as an agent within a CSC. In some implementations, agent device 230 may provide an agent with access to one or more of the organization's line-of-business (LOB) applications, which may include one or more types of applications that are central to the services and/or processes of the organization. Examples of an LOB application may include a an organization's website, an application for an account of the customer (e.g., a customer account), an application for ordering products or services, an application for providing technical support to the customer, an application for executing financial transactions, an application for logging feedback from the customer, etc. Agent device 230 may include a server-side version of chat tool app 215-1, which may enable agent device 230 to receive a dynamic transaction container (e.g., agent browser) that includes a chat session GUI and a predictive feed application GUI from digital assistant services system 210, display the GUIs concurrently to an agent, enable the agent to perform a real-time sentiment analysis, etc.

User device 240 may include a device capable of communicating via a network, such as network 260. For example, user device 240 may correspond to a mobile communication device (e.g., a smartphone, or a personal digital assistant (PDA)), a portable computer device (e.g., a laptop computer, a tablet computer, a wearable computer), and/or another type of device. In some implementations, user device 240 may include a client-side version of a chat tool app 215-2 that may enable establishment of a chat session by initiating contact with agent device 230, and an exchange of chat messaging. For example, chat tool app 215-2 may include a customer browser, hosted by user device 240, which enables customer access to digital assistant services systems 210.

NLP engine 250 may include one or more computing devices, such as a server device or a collection of server devices. NLP engine 250 may be an AI-based third-party vendor service, for example, IBM Watson™, Amazon Lex™, or Google Dialogflow™, capable of processing data from a chat session between a user of user device 240 and an agent of agent device 230. NLP engine 250 may analyze the chat data and detect one or more intent associated with the customer chat session and/or one or more entities corresponding to an available chat flow. NLP engine 250 may provide the chat flow information and/or analysis of the chat flow information to digital assistant services system 210. Additionally, or alternatively, NLP may determine that no chat flows are available for the detected intent, and notify digital assistant services system 210 of the fallout.

Network 260 may include one or more wired and/or wireless networks. For example, network 260 may include a cellular network (e.g., a third generation (3G) network, a fourth generation (4G) network, a 4.5G network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 260 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
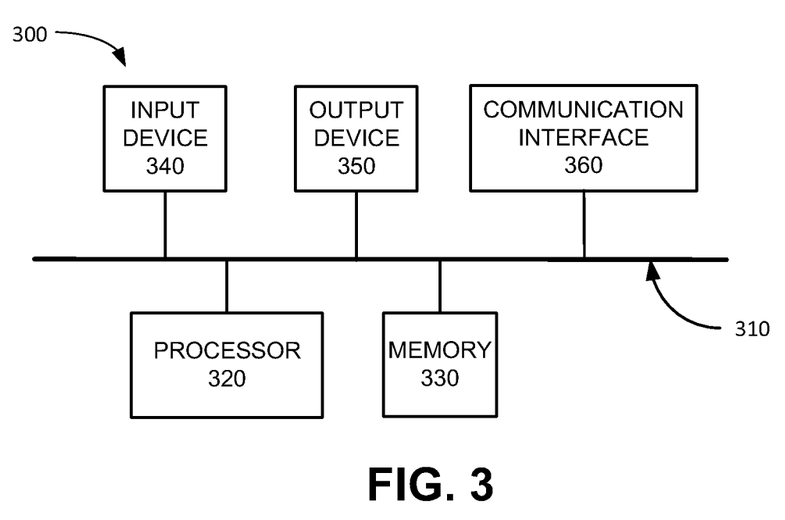
FIG. 3 is a diagram illustrating exemplary components of a device that may be included in one or more components of FIG. 1 according to an implementation described herein.

FIG. 3 is a diagram illustrating example components of a device 300 according to an implementation described herein. Digital assistant services system 210, chat tool app 215, agent device 230, user device 240, and/or NLP engine 250 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, a solid state drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, output device 350 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to a chatbot services system platform configured to enable passive monitoring and/or dynamic assistance by a service agent. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
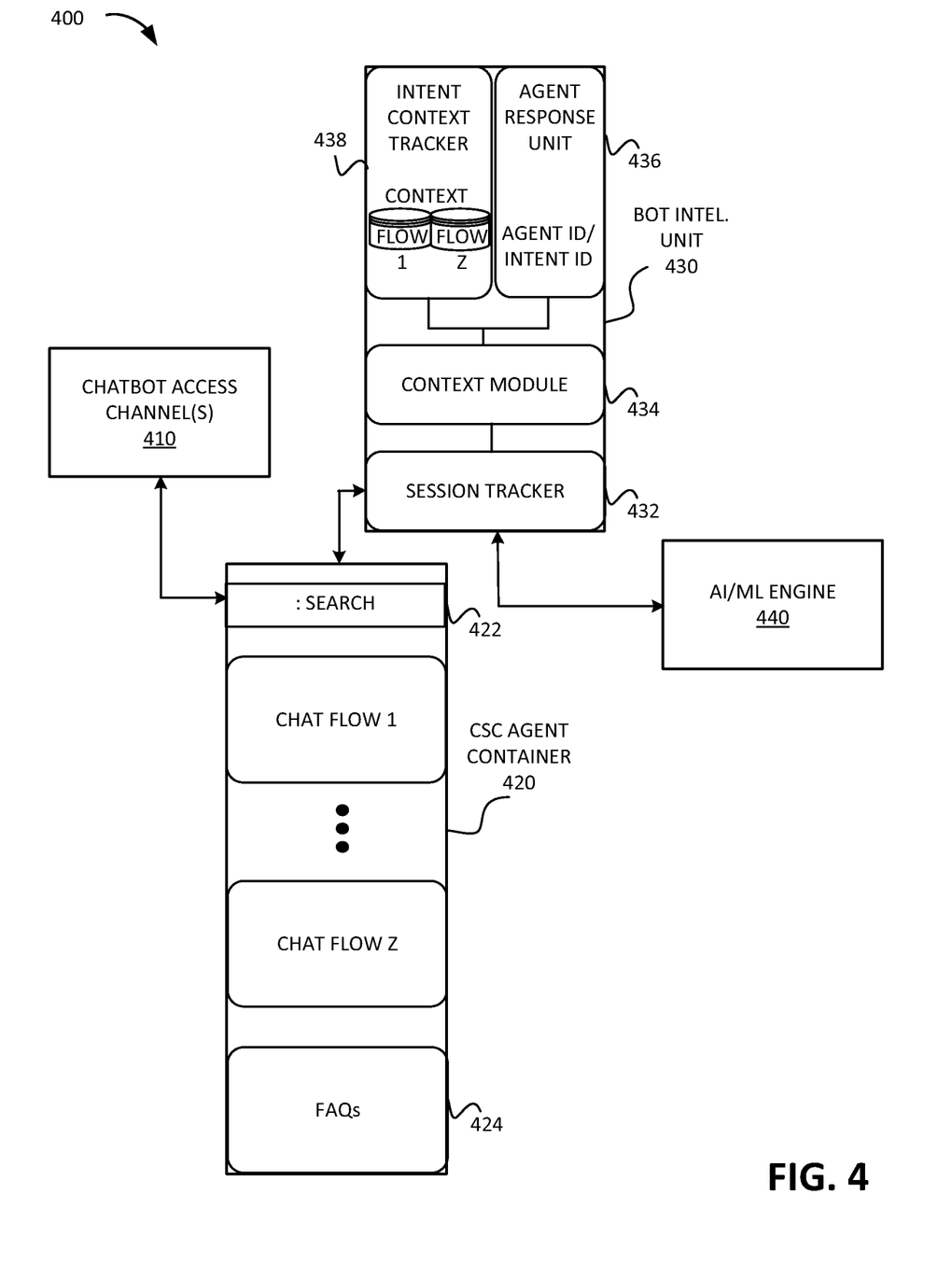
FIG. 4 is a diagram illustrating exemplary functional components of the chatbot system of FIG. 2 according to an implementation described herein.

FIG. 4 is a functional block diagram of a system 400, which is an exemplary implementation of one agent-guided digital assistant system according to various aspects. It will be understood that the FIG. 4 blocks are graphical representations of logical functions, arranged for visibility and convenience in description and neither the blocks nor their arrangement are intended as any representation of any particular allocation, distribution, or grouping of functions to particular hardware.

System 400 may include one or more chatbot access channels 410, configured with a CSC agent container 420, a bot intelligence (intel) unit 430, and an AWL engine 440. For example, CSC agent container 420 and/or bot intel unit 430 may be implemented by digital assistant services system 210, and/or AI/ML engine 410 may be implemented by NLP engine 250. Chatbot access channels 410 may be associated with an operator of system 400 and may provide an interface for end user device 240 and enable initial contact with a CSC and chat session messaging with a chatbot and/or a CSC agent. Chatbot access channels 410 may include, for example, a customer browser accessible website, a social media page (e.g., a Facebook™ page), or other messaging account (e.g., Twitter™). In other implementations, chatbot access channel 410 may include chat tool app 215.

A chat session may be initiated by a customer's input containing a first expression of an intent via one or more of chatbot access channels 410, for example, entry of text in a chat window on a website associated with a CSC. The customer may have activated, for example, a chat service app on user device 240. As another example, the website may have detected a customer action, such as a click pattern, or the customer's browser history, as indicating a chat session may be appropriate, and the customer presented with a chat window pop-up via one or more of chatbot access channels 410.

A message received from a customer via a chatbot access channel 410 may be provided, for example, to a search element 422 of CSC agent container 420. The message text (e.g., terms and expressions) may be parsed and/or searched for information such as a chat session identifier (ID), a customer ID, etc. In one implementation, search element 422 may transform the customer input into a format acceptable to AI/ML, engine 440. In another implementation, search element 422 may apply stemming processing (e.g., reducing terms to their base or root form), for example, to the customer input. Search element 422 may determine natural language (NL) text, for example, and/or determine whether a response to the customer is to be generated. When a response is to be generated, the search data may be provided to a session tracker 432, for example, of bot intel unit 430. Session tracker 432 may determine whether the chat message is associated with an ongoing customer chat session and initiate actions for generating an appropriate response to the customer. In one implementation, session tracker 432 may include a library of interfaces and protocol translation applications (e.g., NLP plug-ins), for each of the different NLP engines 250 to interface with AI/ML engine 440.

Session tracker 432 may provide, via an appropriate NLP plug-in, the NL search data may to AI/ML engine 440 for NLP, for example. AI/ML engine 440 may detect one or more entity and/or one or more recognizable intents associated with the chat message. AWL engine 440 may determine whether at least one available chat flow matches a detected recognizable intent, such as an intent to obtain information on a product, an intent to upgrade a service/product, a search for information of a topic, etc. AWL engine 440 may notify bot intel unit 430 whether a chat flow is available. AI/ML engine 440 may also include a bot training improvement component that may modify intent-flow matching data based on input received from an agent relative to matching determinations. In some instances, AI/ML engine 440 may not match a customer's verbalized intent to any intent that AWL engine 440 has been trained to recognize, which may produce a fallout event.

AI/ML engine 440 may send results of the NLP to session tracker 432 and session tracker 432 may identify a customer chat session to associate with the chat message. A context module 434 of bot intel unit 430 may associate NL data, such as entities, with a particular chat flow of a customer chat session. The term "module," as used in this context and elsewhere herein, should be construed to include a logical grouping or association, and implies nothing as to physical location or distribution, or technology, of the instructions, or of the resources that execute the instructions. Context module 434 may communicate with an agent response unit 436 and an intent context tracker 438 of bot intel unit 430. Agent response unit 436 may maintain agent ID-intent ID data that associates a particular intent with a particular agent based on the agent's input recorded for a response generated for an intent detected from NLP search data. Intent context tracker 438 may store context information associated with chat messaging sequences for a number of chat flows.

In one implementation, context module 434 may provide a chatbot response to the customer chat message to session tracker 432. Session tracker 432 may provide the chatbot response for the identified chat flow to CSC agent container 420. In one implementation, the chatbot response may include a GUI object or widget. CSC agent container 420 may present the chatbot response on a display in a chat flow that may include a transcript of the chat session messaging sequence. CSC agent container 420 may include a library of interfaces and protocol translation applications that may be configured to present chat session transcripts with a generic interface. A CSC agent may review the chatbot response and may select from, approve, and/or alter the chatbot response in any manner. The CSC agent may forward the selected/approved chatbot response or the altered chatbot response to the customer using the same chatbot access channel 410 through which the customer inquiry was received. In one implementation, the CSC agent may forward the GUI object to the customer using the same chatbot access channel 410.

Figure 5:
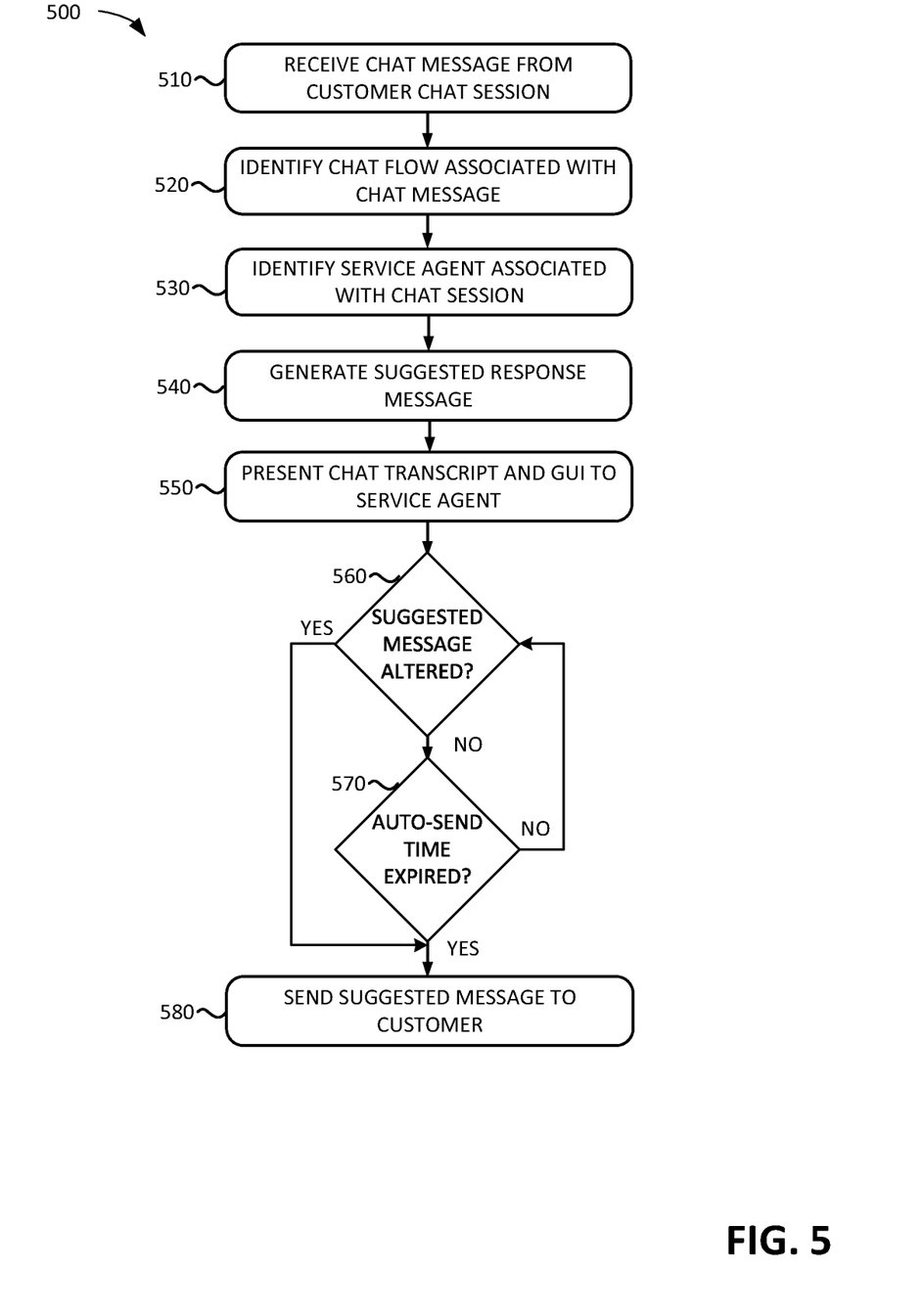
FIG. 5 is a flowchart of a process for providing chatbot services according to an implementation described herein.

FIG. 5 is a flow diagram showing exemplary operations of a process 500 for service agent monitoring and/or handling of a customer chat session in a customer chat session in one or more systems and methods for customer issue resolution according to various implementations. Some examples of operations will be described with reference to one or more of FIGS. 1-4.

The description of process 500 assumes that a customer via user device 240 has submitted, via chatbot access channel 410, an inquiry to a CSC, and a customer chat session has been initiated with a chatbot. Further assume that one or more expressed customer intents have been detected in a messaging sequence of the customer chat session using AL/ML engine 440, and the detected intents has been mapped by bot intel unit 430 to corresponding chat flows. The respective chat message sequencing recorded for each chat flow may be contained in a transcript that is displayed to a service agent (e.g., agent device 230) via CSC agent container 420. Further assume that the chatbot system is operating a service agent at agent device 230 assist mode in which the service agent may passively monitor and/or dynamically assist the customer chat session.

Process 500 may include a CSC chat system receiving a question or a comment from customer via a chatbot channel during an ongoing customer chat session (block 510). The CSC chat system (e.g., digital assistant services system 210) consults with NLP engine 250 to detect one or more customer intents in the chat message, and identifies corresponding chat flows for the chat session (block 520). Using a chat flow ID associated with the chat flow, and a service agent ID identifying a service agent at agent device 230 associated with the chat session (block 530), the CSC system may identify standardized chat response messages and/or agent-altered chat response messages referenced in an index of chat flow IDs and service agent IDs (block 540).

The CSC system may include a console device operated by the service agent at agent device 230. The console device may present a chat transcript recorded for the chat session via a chat window, for example, and a predictive feed app GUI, concurrently (block 550). The GUI may include an agent browser that enables the service agent to passively monitor and/or dynamically assist with formulation of a chat response message to the outstanding customer chat message. Referring to FIG. 5, process 500 may include the CSC chat system determining whether the service agent has performed any action to alter the text of suggested chat response message or modify a GUI object (block 560). For example, the service agent may alter the text of the message and/or modify a GUI object associated with the chat response message (block 560—YES) and sent the chat response message to the customer (block 580). In another implementation, CSC chat system may detect an input by the service agent to send or skip the suggested chat response message.

If no input has been received from the service agent via the GUI, the CSC chat system may determine whether an amount of time configured for an auto-send feature has expired (block 570). If the time has not expired (block 570—NO), process 500 may return to block 560. When the CSC system determines that the time has expired (block 570—YES), the CSC system may send the suggested chat message response to the customer via chatbot access channel 410, without any action performed by the service agent (i.e., passive monitoring) (block 580).

Figure 6:
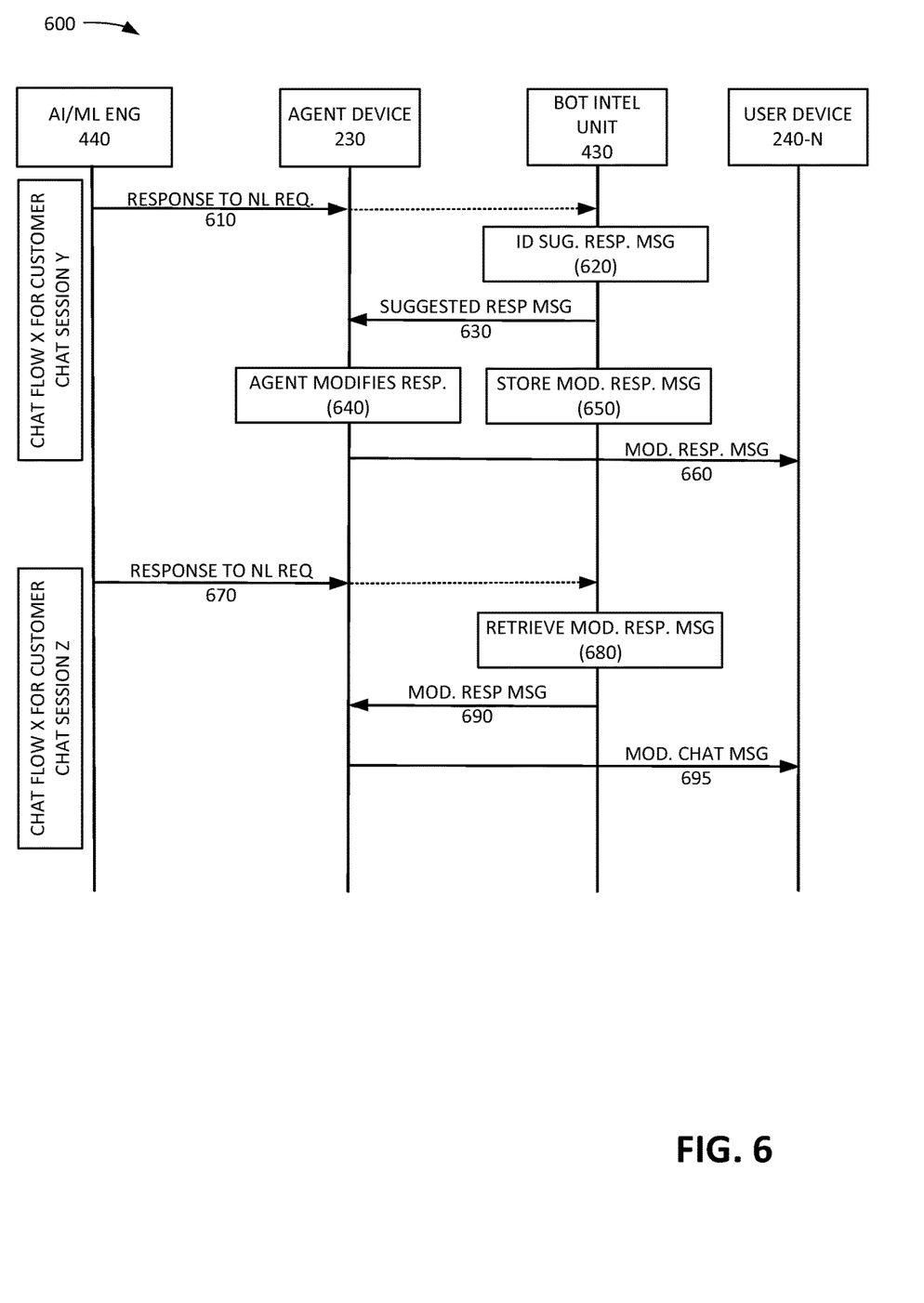
FIG. 6 is an exemplary messaging/operations diagram according to an implementation described herein.

FIG. 6 illustrates an exemplary messaging/operations diagram for portions of agent-assisted chatbot chat sessions 600 for multiple customer chat sessions involving the same chat flow topic. For example, an illustrated portion of customer chat session "Y" involving chat flow "X" includes AI/ML engine 440 providing a response 610 to a natural language (NL) request, to agent device 230, for example, located at a CSC, and/or to bot intel unit 430. In one implementation, AI/ML engine 440 may perform NL processing on an outstanding customer chat message to detect a customer intent therein and match the detected intent to an available chat flow. Bot intel unit 430 may identify a suggested response message(s) 620, which includes text and/or a GUI object, based on the NL information obtained from AI/ML engine 440. The service agent may view the suggested response message(s) 630, for example, via CSC agent container 420. The service agent may decide to alter the text of the suggested response message and/or modify a GUI object 640. Bot intel unit 430 may store the modified response message 650, for example, with a service agent ID and a chat flow ID, and the modified response message may be posted to chat session "Y" and sent to the customer at user device 240-N 660, for example, via the appropriate chatbot access channel 410.

Referring to FIG. 6, an illustrated portion of customer chat session "Z" involving chat flow "X" includes AI/ML engine 440 providing a response 670 to a NL request, to agent device 230, for example, located at a CSC, and/or to bot intel unit 430. Customer chat session "Z" may occur subsequent to customer chat session "Y" and may involve a different customer. In one implementation, AWL engine 440 may perform NL processing on an outstanding customer chat message to detect a customer intent therein and match the detected intent to an available chat flow. Bot intel unit 430 may identify a stored, modified response message(s) 680, which includes text and/or a GUI object, based on a service agent ID and a chat flow ID associated with the NL information. The service agent at agent device 230 may view the modified response message(s) 690, for example, via CSC agent container 420. In one implementation, the service agent at agent device 230 may be provided with an indicator (e.g., a flag or other visual indicator) that the modified response message is one that the service agent has previously modified and approved, and the service agent may approve of the previously modified response message without other modification. The approved response message may be posted to chat session "Z" and sent to the customer at user device 240-N 695, for example, via the appropriate chatbot access channel 410.

Figure 7:
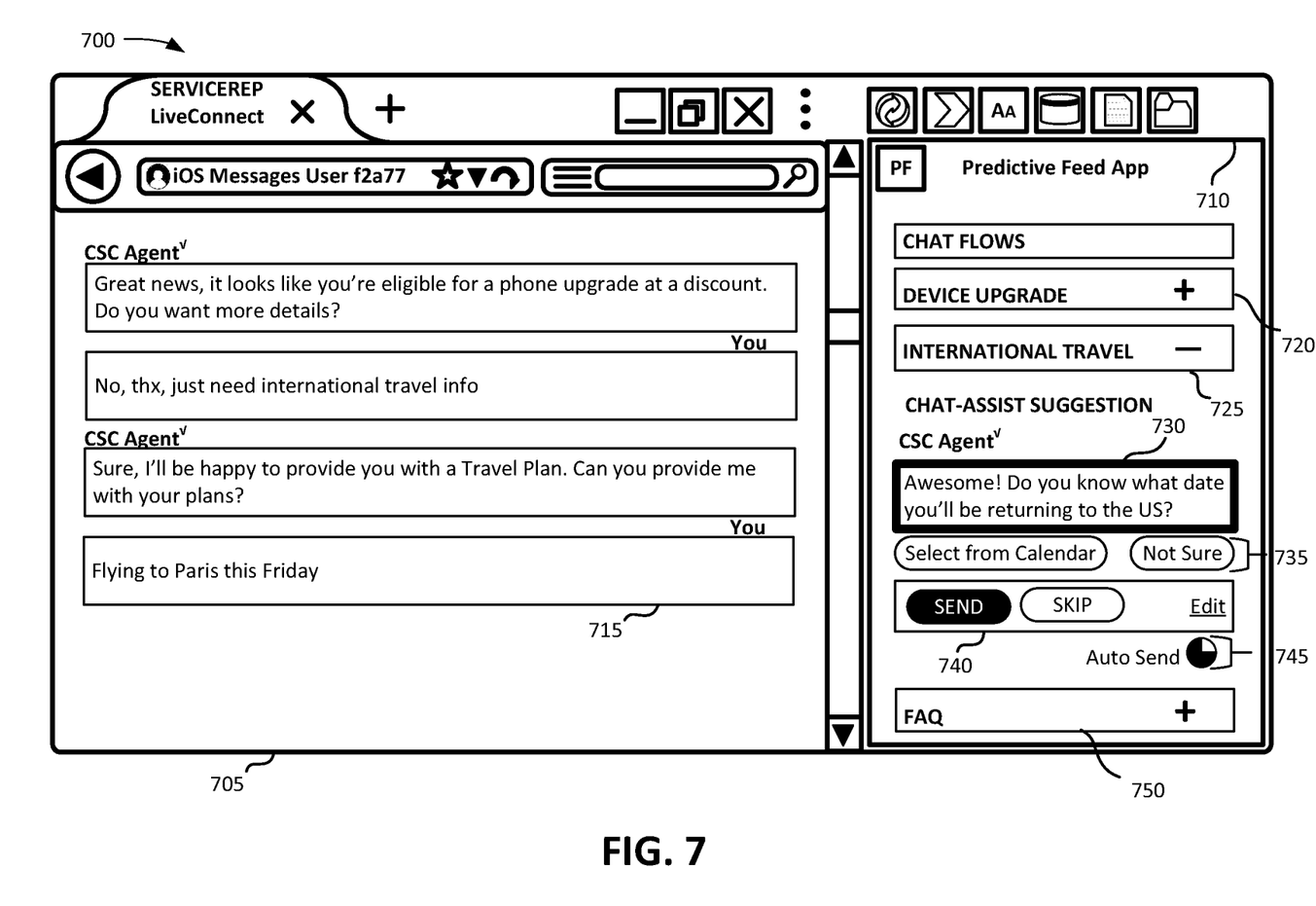
FIG. 7 illustrates an example agent browser screenshot presented via a network device according to an implementation described herein.

FIG. 7 illustrates an exemplary agent browser 700 showing features and exemplary operations in instances of a process for service agent assistance in a customer chat session using integrated CSC chatbot resources into a single service agent GUI source according to various implementations. For example, CSC agent container 420 may display, at a single console, a GUI that includes a chat window field 705 including a transcript of an alternating messaging sequence exchanged between the customer and the CSC chatbot and a predictive feed app field 710 including an agent assist tool that displays suggested responses to an outstanding customer chat message as the last step before sending to the customer and posting to chat window field 705. In one implementation, a service agent may passively monitor the chat session by accessing the consolidated transcript/agent assist tool and reviewing the associated transcript and the proposed responses, for example, in real time. The service agent may also or alternatively interact with the agent assist tool to guide the chatbot as described herein.

In the example shown in FIG. 7, a snapshot of the chat session shown in chat window field 705 corresponds to exchanged messages corresponding to two chat flows associated with the determined intents, "device upgrade" and "international travel." A yet-to-be responded to chat message 715 from the customer includes "Flying to Paris this Friday." Predictive feed app field 710 includes a menu including the unexpanded "device upgrade" chat flow 720 and the expanded "international travel" chat flow 725. The agent assist tool includes a suggested response message 730 from the CSC agent, "Awesome! Do you know what date you'll be returning to the US?" For example, bot intel unit 430 may have determined that one or more additional elements of information, such as a return date, is needed to develop a Travel Plan. Suggested response message 730 may also include GUI objects 735 (e.g., buttons) that are configured to allow the user to select a date from a calendar or to indicate the customer's uncertainty regarding a return date, etc.

The agent assist tool may include interactive GUI objects 740 that allow a service agent to send the suggested response message, skip the suggested response message, edit the suggested response message, etc. For example, the service agent may alter the text of the suggested response message and/or one or more of GUI objects 735, may add other GUI objects, etc. In one implementation, predictive feed app field 710 may also include an "auto send" timer object 745 that indicates a predetermined amount of time after which the suggested response message will be sent to the customer (and post to the chat session) without the service agent acting upon the suggested response message. For example, the service agent may be given a particular number of seconds to review, approve, and/or alter the suggested response message before the message is automatically sent to the customer.

In some implementations, the amount of time preceding the auto send operation is configurable. In other implementations, the service agent may incrementally extend and/or temporarily pause the predetermined amount of time before the time has elapsed. In one or more implementations, the predetermined amount of time may be a value that is based on a relative confidence level that is associated with the suggested response. For example, if the suggested response is identical to a response that the service agent has previously composed and/or approved for the identified customer intent and/or chat flow subject matter, the auto send time may be proportionally shortened. In scenarios in which the service agent at agent device 230 approves of the suggested response message, the auto send time may be bypassed at any time by the service agent's input via agent device 230, such as activating the "send" button. In one implementation, the service agent at agent device 230 may be given the option to select to send a frequently asked question (FAQ) 750 chat response to the customer. For example, predictive feed app 710 may provide an option to inquire if the customer would like information regarding making calls while the customer is in Paris.

In this manner, agent browser 700 may be provided for the service agent, enabling the agent to access a chat window provided via a CSC website or any other chatbot channel, as well as an agent assist tool. Agent browser 700 may be implemented, for example, as a secured browser, e.g., locked to a specific space in the chatbot channel, such as a specific chat window of a website associated with the CSC. In a similar implementation, the customer's user device 240 may host a customer browser (not separately visible in FIG. 7), through which the customer may access, for example, the above-described chat window.

Implementations described herein provide for a chatbot platform that enables a service agent's real-time sentiment analysis in chat response formulations; learns and emulates the particular service agent's "writing style;" re-uses the service agent's altered messages; and re-purposes the service agent's modifications of GUI objects in subsequent chat sessions that involve the particular service agent and a similar chat flow topic.

Additional implementations described herein provide for a conversational AI platform that enables one service agent to drive multiple customer transactions concurrently; obviates the need for the service agent to consult multiple internal/external websites; provides for prompts to customers for providing entity information that may be extracted and used to inform a chat flow; and auto-populate suggested response messages that are improvised by the service agent.

In the preceding, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 5, and a series of messaging/operations has been described with respect to FIG. 6, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, via a chatbot access channel, a chat message from a user device associated with a customer chat session;
   determining, by a network device, that the chat message includes a customer intent that corresponds to a chat flow for the customer chat session;
   generating, by the network device, one or more suggested response messages based on the chat message, wherein at least one of the one or more suggested response messages includes a previously stored chat message response corresponding to the customer intent and incorporating a first alteration to text of the previously stored chat message response made by a service agent;
   presenting, via a display associated with the network device, a transcript of a messaging sequence for the customer chat session concurrently with a user interface (UI) that enables the service agent to perform an action with respect to making a second alteration to the text of the previously stored chat message response; and
   sending, via the chatbot access channel, the previously stored chat message response to the user device.

2. The method of claim 1, wherein sending the previously stored chat message response includes sending the previously stored chat message response after a predetermined amount of time without the service agent performing the action.

3. The method of claim 2, wherein the predetermined amount of time is a value that is based on the one or more suggested response messages.

4. The method of claim 2, wherein the predetermined amount of time is a value that is based on a relative confidence level associated with the one or more suggested response messages.

5. The method of claim 1, wherein sending the previously stored chat message response further comprises sending the previously stored chat message response having the second alternation to the text made by the service agent.

6. The method of claim 1, wherein the one or more suggested response messages includes a UI object that is configurable by the service agent.

7. The method of claim 1, further comprising:
   receiving input from the service agent with respect to the second alteration to the text; and
   indexing, using an identifier for the service agent and an identifier for the customer intent, the altered previously stored chat message response.

8. A network device comprising:
   a communication interface;
   a memory for storing instructions; and
   a processor configured to execute the instructions to:
     receive, via a chatbot access channel, a chat message from a user device during a customer chat session;
     determine that the chat message includes a customer intent that corresponds to a chat flow for the customer chat session;
     generate one or more suggested response messages based on the chat message, wherein at least one of the one or more suggested response messages includes a previously stored chat message response corresponding to the customer intent and incorporating a first alteration to text of the previously stored chat message made by a service agent;
     present, via a single display, a transcript of a messaging sequence for the customer chat session concurrently with a user interface (UI) that enables the service agent to perform an action with respect to making a second alteration to the text of the previously stored chat message response; and
     send, via the chatbot access channel, the previously stored chat message response to the user device.

9. The network device of claim 8, wherein to send the previously stored chat message response, the processor is further configured to send the previously stored chat message response after a predetermined amount of time without the service agent performing the action.

10. The network device of claim 9, wherein the predetermined amount of time is a value that is based on the one or more suggested response messages.

11. The network device of claim 9, wherein the predetermined amount of time is a value that is based on a relative confidence level associated with the one or more suggested response messages.

12. The network device of claim 8, wherein to send the previously stored chat message response, the processor is further configured to send the previously stored chat message response having the second alternation to the text made by the service agent.

13. The network device of claim 8, wherein the one or more suggested response messages includes a UI object that is configurable by the service agent.

14. The network device of claim 8, wherein the processor is further configured to:
   receive input from the service agent with respect to the second alteration to the text; and
   index, using an identifier for the service agent and an identifier for the customer intent, the altered previously stored chat message response.

15. A non-transitory computer-readable medium including instructions that, when executed by a processor of a network device, cause the network device to:
   receive, via a chatbot access channel, a chat message from a user device during a customer chat session;
   determine that the chat message includes a customer intent that corresponds to a chat flow for the customer chat session;
   generate one or more suggested response messages based on the chat message, wherein at least one of the one or more suggested response messages includes a previously stored chat message response corresponding to the customer intent and incorporating a first alteration to text of the previously stored chat message made by a service agent;

present, via a display, a transcript of a messaging sequence for the customer chat session concurrently with a user interface (UI) that enables the service agent to perform an action with respect to making a second alteration to the text of the previously stored chat message response; and send, via the chatbot access channel, the previously stored chat message response to the user device.

16. The non-transitory computer-readable medium of claim 15, further including instructions that, when executed by the processor cause the network device to:

send the previously stored chat message response after a predetermined amount of time without the service agent performing the action.

17. The non-transitory computer-readable medium of claim 16, wherein the predetermined amount of time is a value that is based on the one or more suggested response messages.

18. The non-transitory computer-readable medium of claim 16, wherein the predetermined amount of time is a value that is based on a relative confidence level associated with the one or more suggested response messages.

19. The non-transitory computer-readable medium of claim 15, wherein to send the previously stored chat message response, instructions further cause the network device to send the previously stored chat message response having the second alternation to the text made by the service agent.

20. The non-transitory computer-readable medium of claim 15, wherein the one or more suggested response messages includes a UI object that is configurable by the service agent.

* * * * *